United States Patent

Siefert

[15] 3,662,596
[45] May 16, 1972

[54] DEVICE FOR MEASURING STRESS IN METAL TIRE CORDS

[72] Inventor: George J. Siefert, Akron, Ohio

[73] Assignee: The Goodyear Tire & Rubber Company, Akron, Ohio

[22] Filed: Nov. 12, 1970

[21] Appl. No.: 88,960

[52] U.S. Cl. .................................... 73/143, 73/88.5, 73/146
[51] Int. Cl. .......................................................... G01l 5/10
[58] Field of Search ................... 73/88.5 R, 141 A, 143, 146, 73/146.2, 160, 15.6, 95

[56] References Cited

UNITED STATES PATENTS

| | | | |
|---|---|---|---|
| 2,633,019 | 3/1953 | Albrecht et al. | 73/88.5 R |
| 2,795,134 | 6/1957 | Weber et al. | 73/141 A |
| 3,481,189 | 12/1969 | Brennan et al. | 73/88.5 R |
| 3,329,799 | 7/1967 | Carmody | 73/88.5 R X |

Primary Examiner—Charles A. Ruehl
Attorney—F. W. Brunner and Harlan E. Hummer

[57] ABSTRACT

A transducer for measuring tension or compression stresses in a metal tire cord embedded in rubberized material of a tire. The transducer is secured to a metal cord which has been removed from unvulcanized rubber material in which the cord is embedded. The cord with the transducer is then repositioned in the rubber material which is then used to build an uncured tire for placing in a mold and vulcanizing. The transducer includes a metal billet or casing which is soldered in surrounding relation around a portion of the cord. Four strain gauges are secured to opposing flat surfaces of the transducer in special oriented relation to form a full gauge bridge for determining tension or compression while eliminating bending stresses. The bridge has a number of lead wires which are taken from the tire body and fastened to, for example, a Wheatstone bridge for recording the tension or compression in the cord under varying inflation conditions of the tire.

12 Claims, 3 Drawing Figures

PATENTED MAY 16 1972   3,662,596

*INVENTOR.*
GEORGE J. SIEFERT
BY
Harlan E. Hummer
ATTORNEY

DEVICE FOR MEASURING STRESS IN METAL TIRE CORDS

BACKGROUND OF THE INVENTION

The invention is particularly well suited for assessing tension in metal cords used for reinforcing radial type tires, where the cords reinforcing the tire carcass or body are practically meridian, i.e., disposed at angles of from about 70° to 90° measured from a plane passing through the mid-circumferential centerline of the tread of the tire, such plane hereinafter referred to as the centerplane. It is important to determine the various characteristics of the reinforcing metal cords, especially axial tension or compression in the cord under different inflation, loading, and operating conditions. The invention is directed to providing a device for conveniently measuring the tension or compression in such cords.

Briefly stated, the invention is in a transducer which is fastened to a metal cord and used for determining the axial stress in the cord, whether the cord is in tension or compression. The transducer comprises a metal casing with a centrally disposed opening having a diameter slightly larger than the diameter of the cord to be measured. The transducer is provided with a pair of opposing flat surfaces which are parallel to the axial opening in the transducer. A pair of strain gauges are secured to each surface in oriented relation to form a full gauge bridge for measuring only the axial stress in the cord. Each pair of gauges has a couple of leads for fastening to instruments for recording the stress or tension in the tire cord.

DESCRIPTION OF THE DRAWING

The following description of the drawing will be better understood by having reference to the annexed drawing, wherein.

DESCRIPTION OF THE INVENTION

Figure 1:
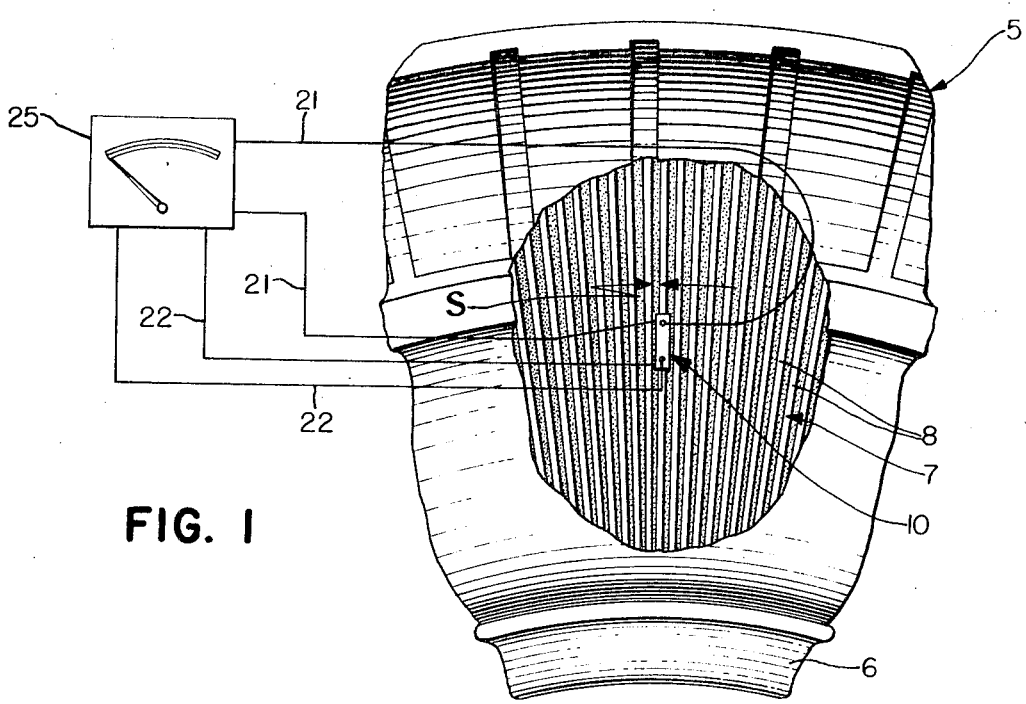
FIG. 1 is a side view of a partial tire, wherein a portion of the tire is cut away to show a transducer in position on a tire cord.

Referring generally to the drawing, and more particularly to FIG. 1, there is shown a pneumatic tire 5 mounted on a standard wheel rim 6. The pneumatic tire 5 has at least one carcass ply 7 reinforced with metal cords 8 which are practically meridian, i.e., disposed at angles in the range of from 70° to 90° measured from the centerplane of the tire 5.

Figure 2:
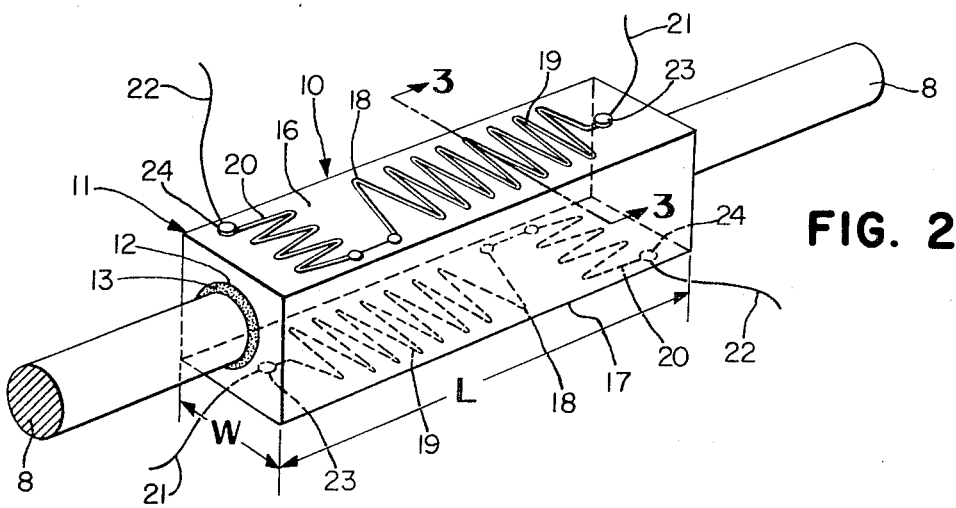
FIG. 2 is an enlarged perspective view of the transducer and adjacent portion of the tire cord.

A transducer, generally indicated at 10, is secured to at least one of the metal cords 8 for measuring only the axial tension or compression in the cord, which is considered representative of the axial stress in each of the cords. The transducer 10 (FIG. 2) comprises an elongated billet or casing 11 which is composed of any suitable material, e.g., steel keyway stock measuring ⅛ × ⅛ inch square and approximately 0.4 inches long. The cross-section of the metal casing 11 is preferably square, as indicated, and has a section width W, which is in relation to the spacing S between adjacent tire cords 8; that is, the transducer 10 should not engage or touch the adjacent cords, or laterally distort the radial or meridian pathway of these cords. The length L of the transducer 10 is in relation to the size of the tire, but should be as small as possible so as not to cause misalignment of the cord selected for measurement, since this might affect the stress in the cord in a way that the measurement would not be representative of the actual stress in the other cords.

Figure 3:
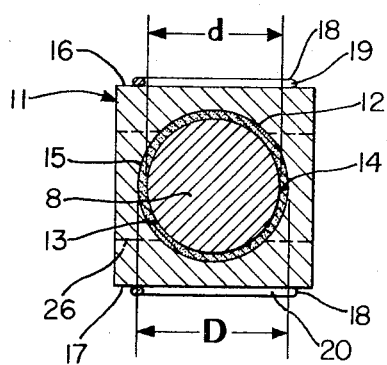
FIG. 3 is a section taken in a plane indicated by the line 3—3 of FIG. 2.

The transducer 10 (FIG. 3) has a centrally disposed, axial opening or bore 12 for receiving a metal tire cord 8. The cylindrical bore 12 is made slightly larger than the round metal cord 8 which it is designed to receive. For example, it was determined that the diameter D of the bore 12 should be between 0.003 – 0.01 inches larger than the diameter $d$ of the tire cord 8. In this particular embodiment, the bore 12 was drilled or made approximately 0.004 inches larger than the tire cord 8. Any suitable means, e.g., silver solder 13, may be used to secure the transducer 10 to the metal cord 8. It is desirable to use a minimum amount of silver solder 13 for maintaining the transducer 10 on the tire cord 8. Yet, the bore or opening 10 should be sufficiently large to allow the silver solder 13 to flow unimpeded around the tire cord 8 and fill the cylindrical cavity 14 between the cord 8 and adjacent inner cylindrical wall 15 of the casing 11.

The transducer 10 is provided with a pair of opposing, parallel flat surfaces 16 and 17 which are, in turn, parallel to the longitudinal axis of the cylindrical bore 12.

A set 18 of strain gauges 19 and 20 are secured to each of the flat surfaces 16 and 17 in specially oriented relation to the longitudinal axis of the casing 11 to compensate for, or eliminate any bending force or stress which might adversely affect measuring the axial tension or compression in the metal cord 8. The strain gauges 19 and 20 are composed of any suitable material, e.g., wire, metal foil, or an appropriate semiconductor material. The strain gauges 19 and 20 on each of the opposing surfaces 16 and 17, are oriented 90 degrees apart, or out of phase and form a conventional full gauge bridge for measuring only tension or compression stresses in the cord 8. The length L of the transducer 10 which, in this case, corresponds to the length of the flat surfaces 16 and 17, should be sufficient to hold the strain gauges 19 and 20. It was found impractical placing appropriate strain gauges on surfaces having a length less than about 0.3 inches.

The full gauge bridge formed by the two sets 18 of strain gauges 19 and 20, is calibrated in $\mu$-strain per pound and preferably has a micro-strain output of from zero to ± 1,500 micro-inches per inch; thus, providing good resolution and linearity for the transducer 10. A pair of electrically conductive leads 21 and 22 extend from opposing ends 23 and 24 of each set 18 of strain gauges 19 and 20 for fastening to, for example, a conventional Wheatstone bridge 25 (FIG. 1) used for recording the tension or compression stresses in the tire cord 8. The sensitivity of the transducer 10 can be increased by reducing the cross-sectional area of the casing 11. This may be accomplished by drilling a hole or opening 26 transversely through the casing 11 between the two sets 18 of strain gauges 19 and 20. Generally, the tire cords 8 are in tension, but the full bridge is capable of measuring cords in compression.

METHOD OF MEASURING STRESS IN TIRE CORD

The transducer 10, including the strain gauges 19 and 20, is secured to a metal tire cord 8 prior to forming an uncured tire suitable for molding and vulcanizing. The metal cord 8 which is picked for measuring, is removed from the unvulcanized rubber material of the carcass ply 7 in which the cord 8 is embedded. The cord 8 is passed through the cylindrical bore 12, until the transducer 10 is in the desired position, whereat the transducer 10 is firmly secured by silver solder 13 to the metal cord 8. The metal cord 8 with the transducer 10 is then reembedded in the rubberized material by repositioning the cord in the configured channel or slot formed in the carcass ply 7 when the cord 8 was removed. The carcass ply 7 is shortly thereafter used to build the uncured tire. The leads 21 and 22 from the strain gauges 19 and 20 are carefully coiled adjacent the outer surface of the sidewall of the uncured tire and covered with a suitable seal which can be readily removed after the tire has been molded and vulcanized, to expose the leads 21 and 22 which are then fastened to, for example, the Wheatstone bridge 25. The stress in the cord may be measured when the tire is uninflated, or when the tire is mounted on a wheel rim and inflated with air to a pressure recommended by the tire manufacturer.

Thus, there has been provided a transducer including several sets of strain gauges disposed in specially configured or oriented relation on the transducer to form a full gauge bridge which measures axial tension or compression stresses in a metal tire cord, while eliminating any bending stresses developed in the cord. The transducer is made as small as required for holding the strain gauges, so that the size of the transducer will not adversely affect measuring in a selected tire cord, tension or compression stresses which are representative of stresses in all of the cords. Thus, for example, tension in a cord can be measured under various conditions of inflation before and after operating the tire under various loading and speed conditions.

While certain representative embodiments and details have been shown for the purpose of illustrating the invention, it will be apparent to those skilled in the art that various changes and modifications may be made therein without departing from the spirit or scope of the invention.

What is claimed is:

1. A transducer used for measuring axial stress in a metal tire cord reinforcing a tire, comprising:
   a. a metal casing having a centrally disposed opening extending axially through the casing for receiving a metal cord, the casing having a pair of oppositely disposed parallel flat surfaces which, in turn, are parallel to, and equally spaced from, the opening in the casing; and
   b. a pair of strain gauges secured to each of the opposing surfaces in specially oriented relation to form a full gauge bridge for measuring only axial stress in a cord secured to the transducer, the bridge including a pair of electrically conductive leads extending from opposing ends of each pair of strain gauges.

2. The transducer of claim 1, wherein the strain gauges are composed of electrically conductive material.

3. The transducer of claim 2, wherein the strain gauges are composed of wire.

4. The transducer of claim 2, wherein the strain gauges are composed of metal foil.

5. The transducer of claim 1, wherein the full gauge bridge has a micro-strain output of from 0 to ± 1,500 micro-inches per inch.

6. The transducer of claim 5, which includes means for changing the sensitivity of the full gauge bridge.

7. The transducer of claim 1, wherein the opening of the transducer has a diameter (D) which is between 0.003 and 0.01 inches larger than the diameter ($d$) of the metal cord.

8. In combination:
   a. a metal tire cord embedded in rubberized material;
   b. a metal casing disposed in surrounding relation around a portion of the cord, the casing having a pair of parallel flat surfaces in parallel relation to said portion of the cord;
   c. a pair of strain gauges secured to each of the flat surfaces of the metal casing in specially oriented relation to form a full gauge bridge for measuring only axial stress in the portion of the cord secured within the casing, said bridge including a pair of electrically conductive leads extending from opposing ends of each pair of strain gauges; and
   d. means for securing the casing to the cord.

9. The combination of claim 8, wherein the casing includes an axial opening for receiving said portion of the cord, the opening having a diameter (D) which is from 0.003 to 0.01 inches greater than the diameter ($d$) of the cord.

10. The combination of claim 9, wherein the casing has a minimum length of about 0.3 inches.

11. The combination of claim 10, wherein the casing is composed of steel, and the strain gauges are composed of material selected from the group consisting of wire and metallized foil.

12. The combination of claim 8, wherein means ($d$) includes means for securing the tire cord continuously throughout its length in the opening such that axial tension on the cord is transferred across the cross-sectional area of the casing, including the cross-sectional area of the opening.

* * * * *